United States Patent
Gretz

(10) Patent No.: US 9,735,558 B1
(45) Date of Patent: Aug. 15, 2017

(54) ELECTRICAL CUT-IN FLOOR BOX ASSEMBLY

(71) Applicant: Arlington Industries, Inc., Scranton, PA (US)

(72) Inventor: Thomas J. Gretz, Delray Beach, FL (US)

(73) Assignee: ARLINGTON INDUSTRIES, INC., Scranton, PA (US)

(*) Notice: Subject to any disclaimer, the term of this patent is extended or adjusted under 35 U.S.C. 154(b) by 0 days.

(21) Appl. No.: 15/450,111

(22) Filed: Mar. 6, 2017

Related U.S. Application Data

(60) Provisional application No. 62/304,405, filed on Mar. 7, 2016.

(51) Int. Cl.
*H02G 3/18* (2006.01)
*H02G 3/14* (2006.01)
*H01R 13/74* (2006.01)
*H02G 3/12* (2006.01)
*H01R 13/52* (2006.01)

(52) U.S. Cl.
CPC ......... *H02G 3/185* (2013.01); *H01R 13/5202* (2013.01); *H01R 13/748* (2013.01); *H02G 3/12* (2013.01); *H02G 3/14* (2013.01)

(58) Field of Classification Search
USPC .......................................................... 174/50
See application file for complete search history.

(56) References Cited

U.S. PATENT DOCUMENTS

| | | | | |
|---|---|---|---|---|
| 4,044,908 A | * | 8/1977 | Dauberger | H02G 3/14 174/66 |
| 4,054,222 A | * | 10/1977 | Suk | H02G 3/14 174/66 |
| 5,285,009 A | | 2/1994 | Bowman et al. | |
| 6,265,662 B1 | | 7/2001 | Riedy et al. | |
| 7,126,059 B2 | | 10/2006 | Dinh | |
| 7,348,487 B2 | | 3/2008 | Drane | |
| 7,989,711 B2 | | 8/2011 | Jolly | |
| 8,704,090 B2 | | 4/2014 | Carbone | |
| 9,035,201 B2 | | 5/2015 | Jones | |

* cited by examiner

*Primary Examiner* — Dhirubhai R Patel

(57) ABSTRACT

A cut-in floor box assembly including a bracket assembly, an electrical box, a support plate, and a cover plate for rapidly installing a duplex receptacle flush with a floor. Floor preparation requires simple drilling of the floor and subfloor with hole saws. Two concentric cuts are made in the floor, a hole of a first diameter through the floor and a second, smaller diameter hole through the subfloor. A peripheral wall on the bracket assembly fits within the hole in the subfloor. A floor mounting arrangement on the bracket assembly enables clamping the bracket to the subfloor. A component attachment arrangement on the electrical box is adapted to accept recessed attachment of a duplex receptacle enabling flush mounting of the duplex receptacle with respect to the floor surface. Two removable outlet covers on the cover plate provide convenient access to the receptacles for plug-in of electrical cords.

16 Claims, 9 Drawing Sheets

ELECTRICAL CUT-IN FLOOR BOX ASSEMBLY

This application claims the benefit of provisional U.S. Application No. 62/304,405, filed Mar. 7, 2016.

FIELD OF THE INVENTION

This invention relates to mounting of electrical components to a structure and more specifically to an electrical cut-in floor box assembly for mounting an electrical component to a floor.

BACKGROUND

Homeowners and managers of apartments, commercial buildings, and other structures, often position electrical devices, such as floor lamps or electrical appliances, in the middle of a room. However, most electrical outlets are typically mounted in the walls of the room. As a result, electrical cords are routed across the floor in order to provide line current to the device. Unfortunately, the electrical cords are unsightly and create a tripping hazard. Although some manufacturers offer some devices for providing electrical service in the floor of a room, the devices are typically not easy to install and require a substantial amount of installation time.

Accordingly, what is needed is a device for providing electrical service in the floor of a room. Such a device should minimize the time and effort required to provide a convenient floor receptacle for the plug-in of electrical cords.

BRIEF SUMMARY OF THE INVENTION

The current invention is a cut-in floor box assembly for quickly and easily installing an electrical component, such as a duplex receptacle, substantially flush with a floor. The cut-in floor box assembly includes a bracket assembly for attachment to the floor, an electrical box for attachment to the bracket assembly, a support plate, a gasket, and a cover plate for providing electrical service in the floor of a room. Installing the floor box assembly to a floor requires simple preparation by a single hole saw drilled within the floor. The bracket assembly includes a bracket having a peripheral wall that fits within the hole in the floor, a rim that rests on the surface of the floor, and a floor mounting arrangement for rapidly clamping the bracket. A component attachment arrangement on the electrical box is adapted to accept recessed attachment of a duplex receptacle therein. The cut-in floor box assembly enables substantially flush mounting of the duplex receptacle, or similar electrical component, with respect to the floor surface. The cover plate includes two removable outlet covers which can be removed as necessary for providing plug-in of electrical cords.

OBJECTS AND ADVANTAGES

A first object of the current invention is to provide an electrical cut-in floor box assembly that provides substantially flush mounting of an electrical component, such as a duplex receptacle, in a floor while minimizing floor preparation time and effort.

A second object of the invention is to provide a floor box that includes a floor mounting arrangement for rapidly securing a bracket assembly to the floor.

A further object of the invention is to provide a floor box assembly that provides recessed mounting of a duplex receptacle therein.

Another object of the invention is to provide a floor box that includes removable outlet covers for protecting or accessing the electrical receptacles as needed.

A further object of the invention is to provide a floor box assembly that enables the use of a single hole saw for reduction of floor preparation time.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 16 is a sectional view of the floor box assembly taken along line 16-16 of FIG. 14 with respect to a floor that it will be installed on.

DETAILED DESCRIPTION

Figure 1:
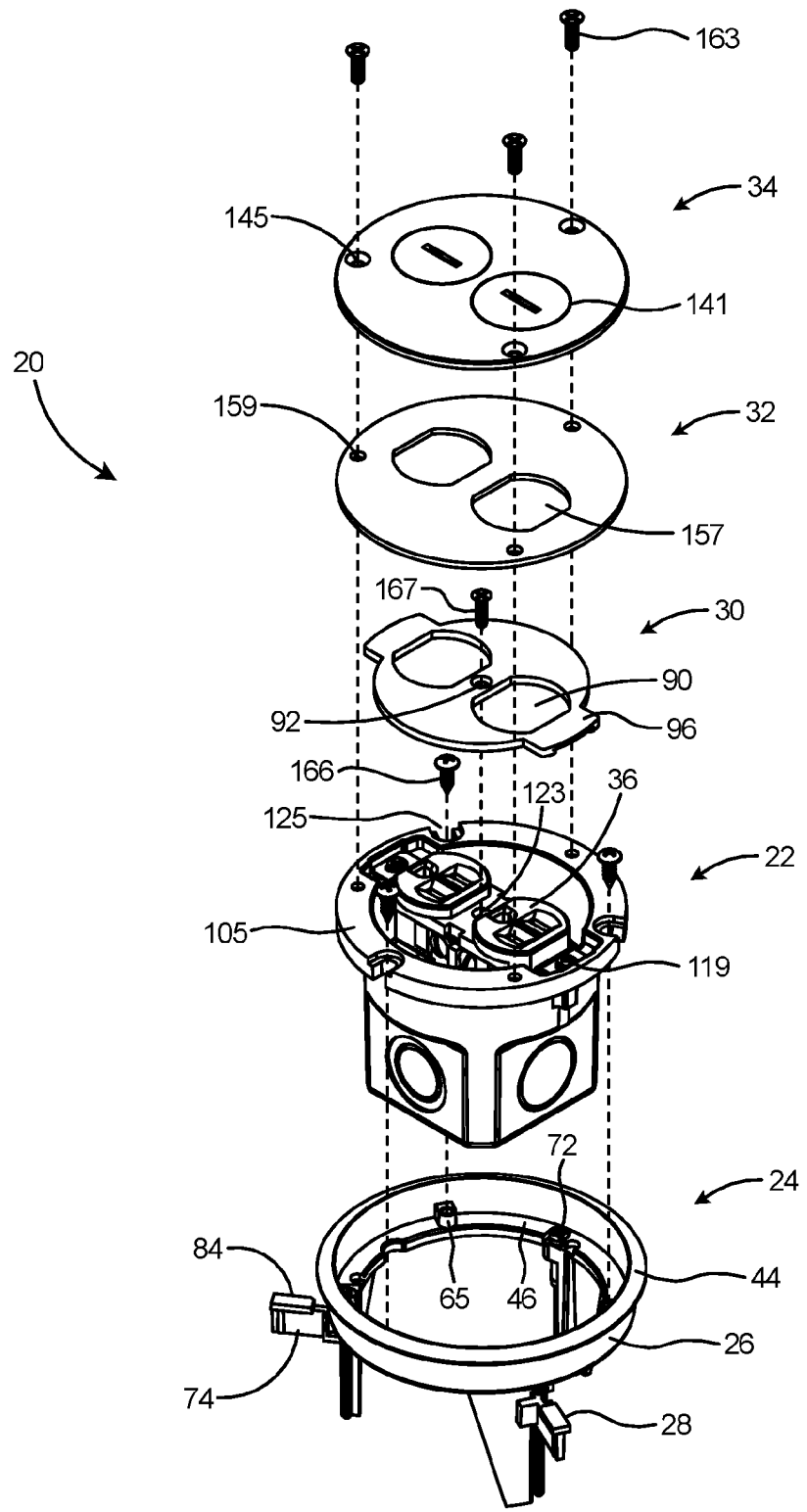
FIG. 1 is an exploded isometric view of a cut-in floor box assembly in accordance with embodiments of the invention.
Figure 2:
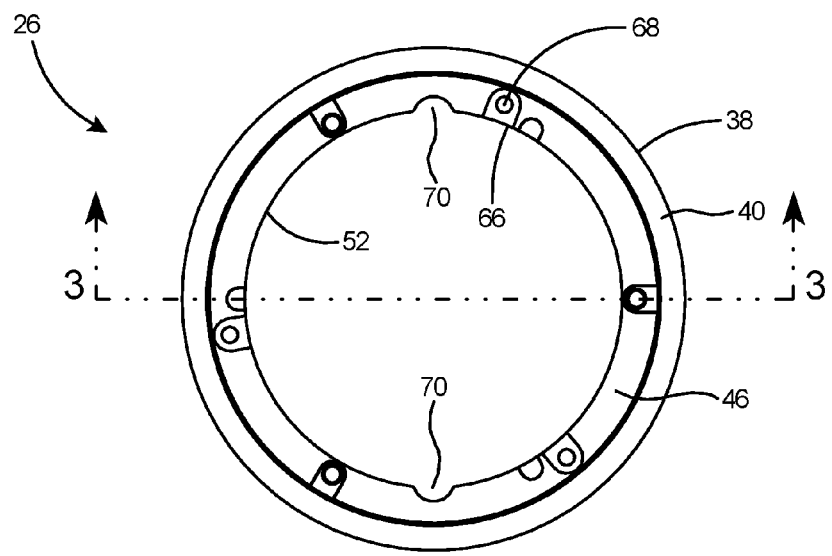
FIG. 2 is a top view of a bracket body that forms a portion of the floor box assembly of FIG. 1.

With reference to FIG. 1, the present invention is an electrical floor box cut-in assembly 20. The floor box assembly 20 includes an electrical box 22, a bracket assembly 24 including a bracket body 26 and a clamping assembly 28, a gasket support plate 30, a gasket 32, and a cover plate 34. The floor box assembly 20 is used to mount an electrical component, such as a duplex receptacle 36 shown in FIG. 1, to a floor or similar structure.

Figure 3:
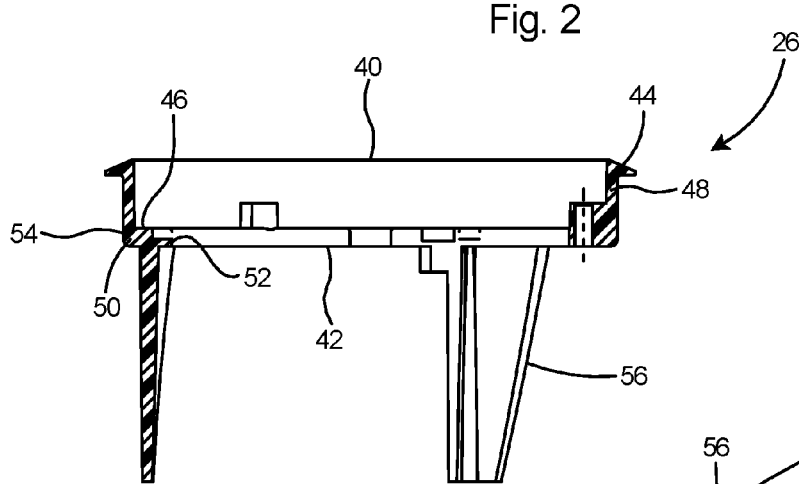
FIG. 3 is a sectional view of the bracket body taken along line 3-3 of FIG. 2.
Figure 3A:
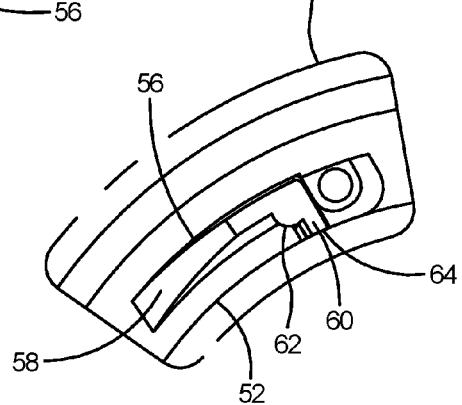
FIG. 3A is a detail view of a leg portion of the bracket body.
Figure 4:
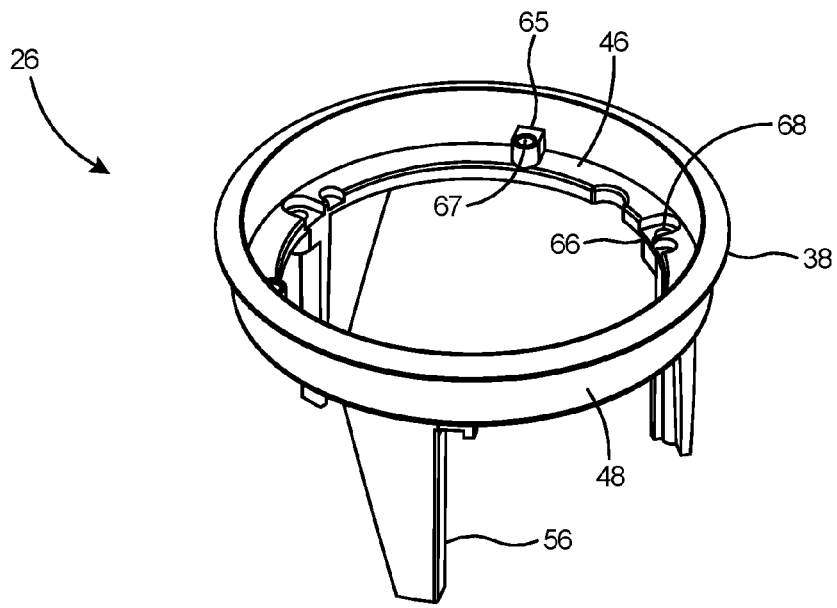
FIG. 4 is a top isometric view of the bracket body.
Figure 5:
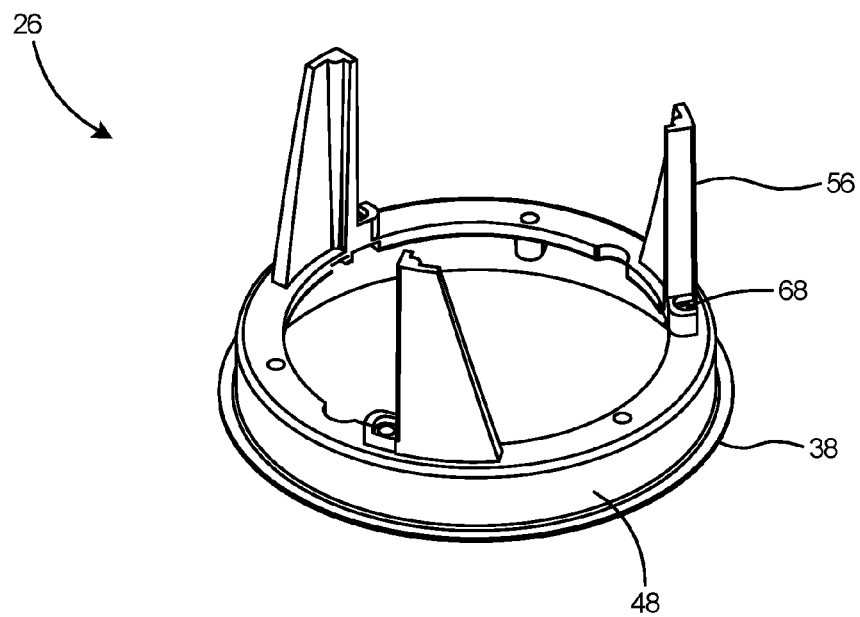
FIG. 5 is a bottom isometric view of the bracket body.
Figure 6:
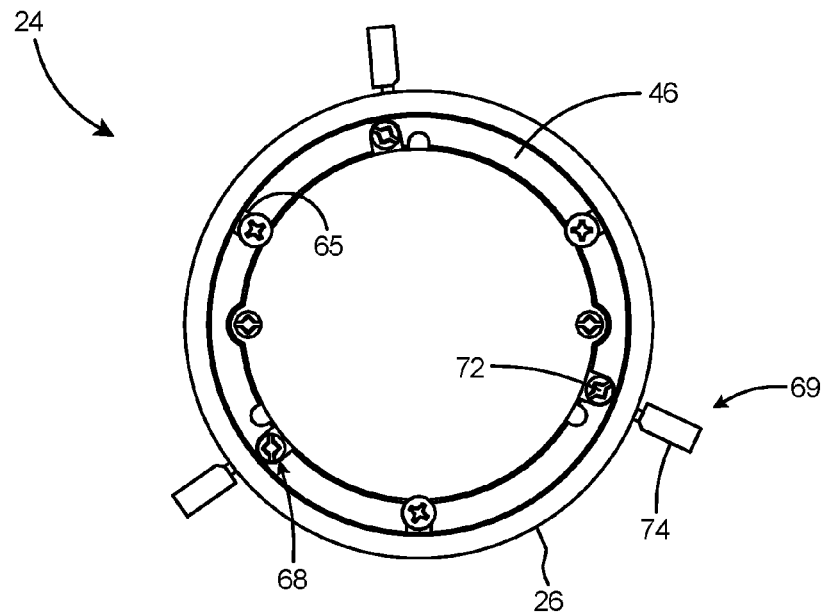
FIG. 6 is a top view of a bracket body assembly in accordance with embodiments of the invention.
Figure 7:
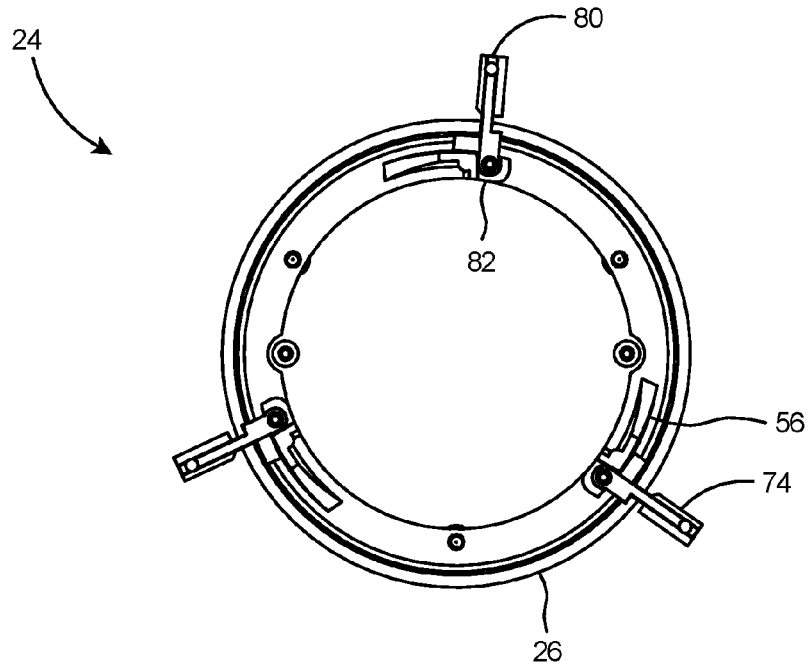
FIG. 7 is a bottom view of the bracket body assembly.
Figure 8:
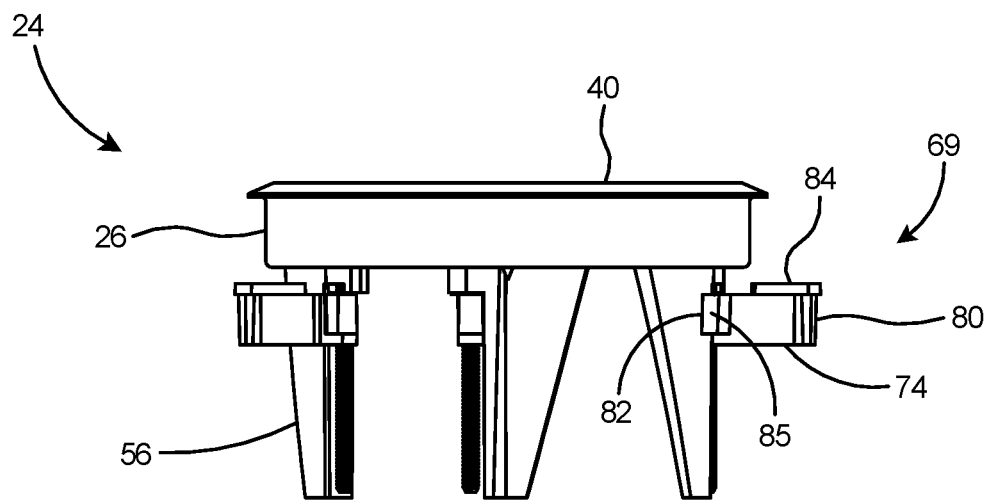
FIG. 8 is a side view of the bracket body assembly.
Figure 9:
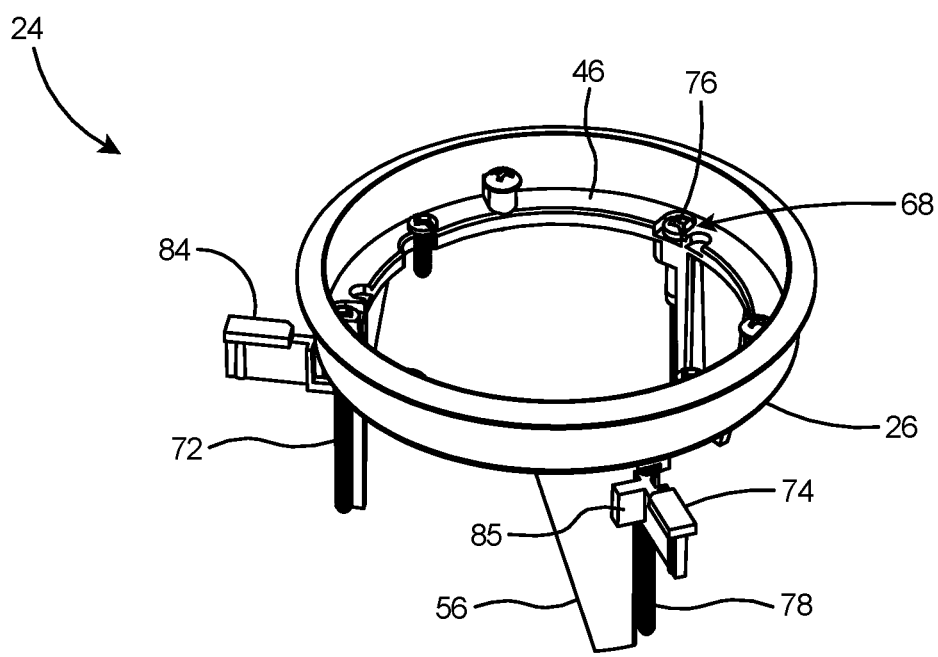
FIG. 9 is an isometric view of the bracket body assembly.

Referring to FIGS. 2-5, the bracket body 26 includes a ring 38 having a top side 40 and bottom side 42. Top side 40 of ring 38 includes an outer rim 44 and a shelf 46 within the outer rim. Bottom side 42 of ring 38 includes a downward extending peripheral wall 48, a collar 50 extending inward from the peripheral wall, the collar 50 including an inner periphery 52 and outer periphery 54, and a plurality of legs 56 extending from the bottom side 42 of the ring 38. As shown in FIG. 3A, the legs 56 are substantially L-shaped in cross-section with a long leg portion 58, a short leg portion 60 and a gusset 62 at the interior corner of the long leg and short leg portions. As shown in FIG. 3A, long leg portion 58 is arcuate in shape to substantially match the outer periphery 54 of the collar 50. Short leg portion 60 includes an end 64 that is flush with the inner periphery 52 of the collar 50. Shelf 46 includes a plurality of recessed areas 66 with apertures 68 therein and a pair of notches 70 within the collar 50 at the inner periphery 52. As shown in FIG. 4, bracket body 26 includes a plurality of bosses 65 extending from the shelf 46 with the bosses 65 including bores 67 therein.

With reference to FIGS. 6-9, the bracket assembly 24 includes a floor mounting arrangement 69 including a plurality of mounting screws 72 with a rotatable wing 74 extending from each of the mounting screws 72. The mounting screws 72 include heads 76 extending through the apertures 68 in shelf 46. The mounting screws 72 include a shank 78 and the rotatable wing 74 secured to each shank. Rotatable wings 74 include a distal end 80 and a proximal end 82. The distal ends 80 of rotatable wings 74 include pads 84 facing toward the top side 40 of the bracket body 26. The proximal ends 82 include a base arm 85 extending laterally from the wing. For purposes of inserting the legs 56 of the bracket assembly 24 through a hole in a floor, rotatable wings 74 may be turned counterclockwise, as viewed from the top side 40 in FIG. 6, to a retracted configuration wherein the base arms 85 of the floor mounting arrangement 69 contact the legs 56 of the bracket assembly 24. After inserting bracket assembly 24 through the hole in the floor, the rotatable wings 74 may be turned clockwise to an extended configuration wherein the pads 84 of the mounting arrangement 69 may be turned clockwise until pads 84 are drawn tightly against the back surface of a mounting surface, thereby securing the bracket assembly 24 to the floor.

Figure 10:
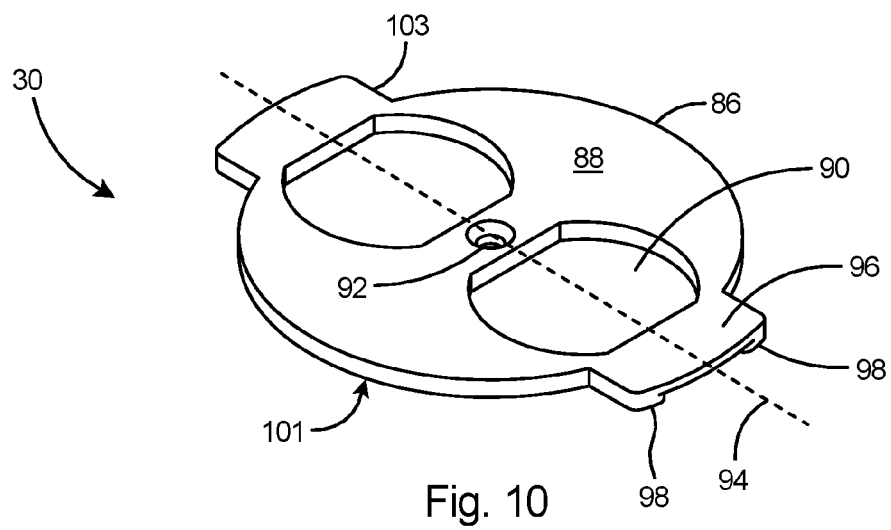
FIG. 10 is an isometric view of a gasket support plate that forms a portion of the floor box assembly of FIG. 1.

Referring to FIG. 10, the gasket support plate 30 includes a substantially planar plate body 86 with a top side 88, two outlet openings 90, and an aperture 92 therein. The aperture 92 and the openings 90 are axially aligned, such as along axis 94 in FIG. 10. Two tabs 96, aligned along axis 94, extend from opposing ends of the gasket support plate 30. A rail 98 extends from the bottom side 101 of the gasket support plate 30 along each side 103 of the tabs 96.

Figure 11:
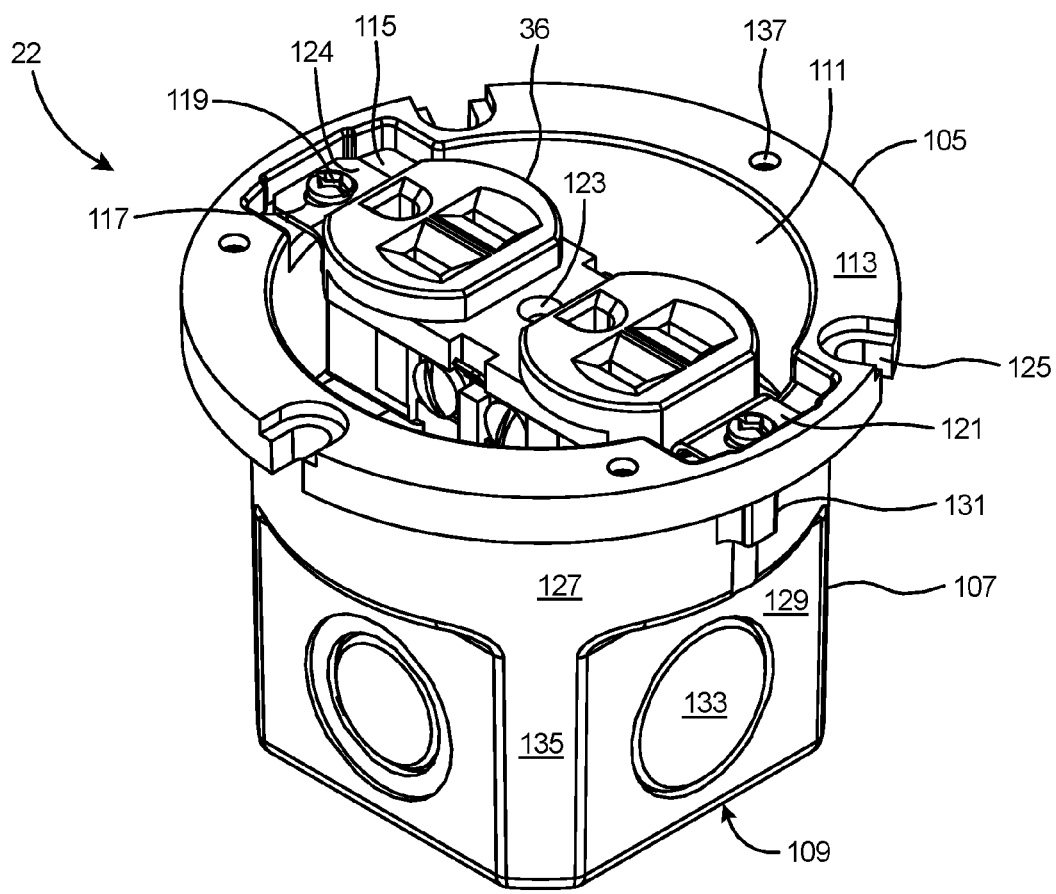
FIG. 11 is an isometric view of an electrical box that forms a portion of the floor box assembly of FIG. 1.

With reference to FIG. 11, electrical box 22 includes a flange 105, side walls 107, and an end wall 109 forming an electrical enclosure 111 therein for enclosing an electrical component such as duplex receptacle 36. Flange 105 includes a substantially planar outer face 113 with two recessed areas 115 therein. Apertures 117 in the recessed areas 115 accommodate mounting of fasteners 119 through the end plates 121 of the duplex receptacle 36. A center aperture 123 on the duplex receptacle will accept a fastener 167 (see FIG. 1) inserted through aperture 92 of gasket support plate 30 (see FIG. 10) for securing the gasket support plate to the duplex receptacle and thus to the electrical box. Duplex receptacle 36 includes ears 124 that facilitate mounting of the receptacle within the electrical box 22. When gasket support plate 30 is secured to the electrical box, the rails 98 (see FIG. 10) of the gasket support plate bracket extend around the ears 124 of the duplex receptacle and extend into the recessed area 115 of the electrical box 22.

As shown in FIG. 1, a plurality of notches 125 in the flange 105 of electrical box 22 enable flange 105 of electrical box 22 to accommodate the bosses 65 on shelf 46 of bracket body 26. Flange 105 fits within outer rim 44 and flush against shelf 46 of bracket body 26.

As shown in FIG. 11, electrical box 22 includes an arcuate side wall 127 adjacent to flange 105, and flat side walls 129 adjacent to the end wall 109. Component mounting bosses 131 extend from opposing sides of the arcuate sidewall 127 at substantially 180° across the arcuate side walls 127 at the open end of the electrical box. Flat side walls 129 may include a knockout 133 therein. An arcuate wall portion 135 extends between each flat side wall 129. Three apertures 137 are provided in the outer face 113 of the flange 105 to facilitate mounting of the cover plate 34 (see FIG. 1) to the electrical box 22.

Figure 12:
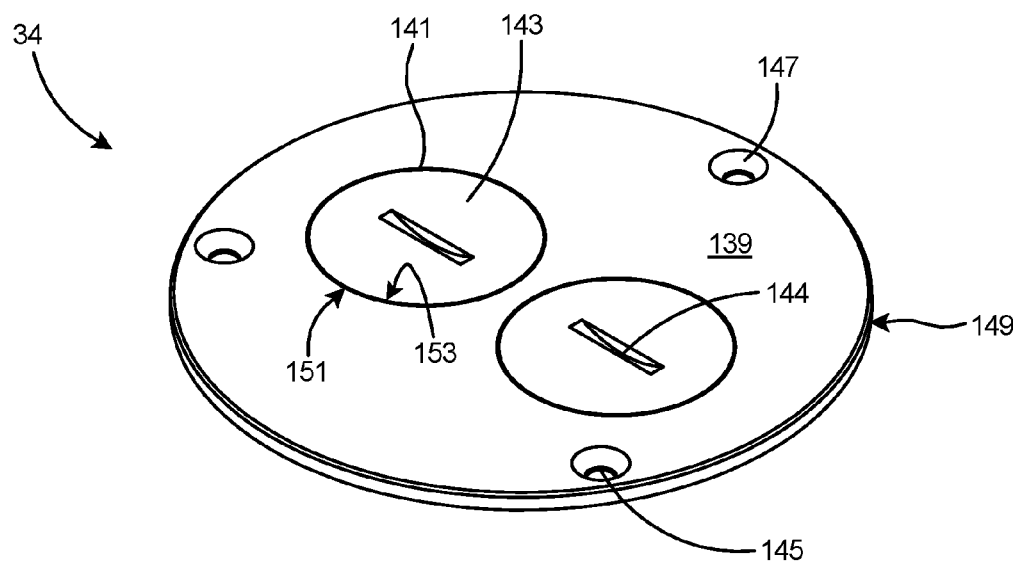
FIG. 12 is an isometric view of a cover plate that forms a portion of the floor box assembly of FIG. 1.

Referring to FIG. 12, the cover plate 34 includes a substantially planar top surface 139 with outlet openings 141 having removable outlet covers 143 with slots 144 therein. Three apertures 145 having countersunk entries 147 are provided along the outer periphery 149 of the cover plate 34. The outlet covers 143 include outer edges 151 that may be threaded to engage complementary threads on the edges 153 of the cover plate 34 at the openings.

Figure 13:
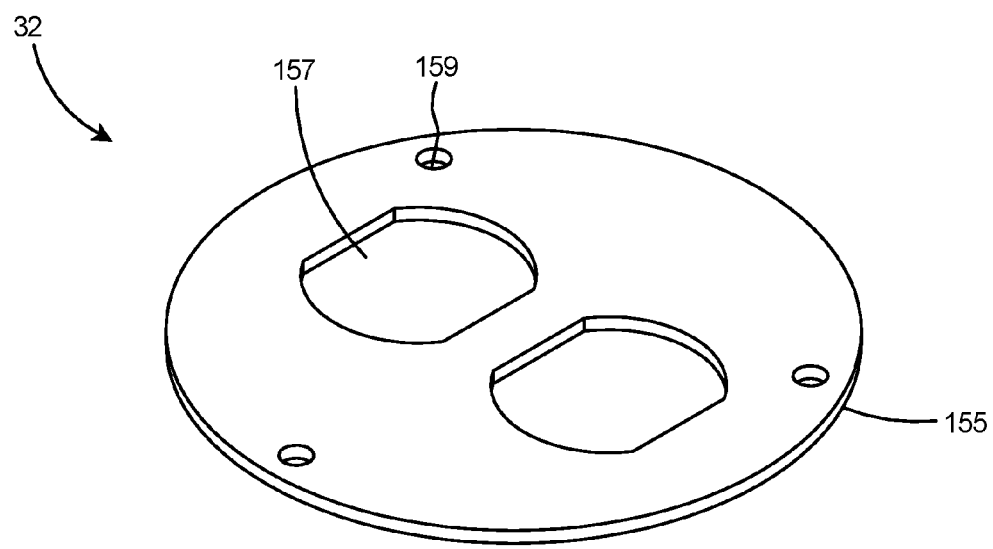
FIG. 13 is an isometric view of a gasket that forms a portion of the floor box assembly of FIG. 1.

As shown in FIG. 13, gasket 32 is substantially planar and includes an outer edge 155, openings 157, and apertures 159 along the outer edge. Each of the openings 157 in gasket 32 are configured for axial alignment with a corresponding outlet opening 141 (see FIG. 12) in the cover plate 34. The gasket 32 is adapted to seat on and seal against the planar outer face 113 (see FIG. 11) of the electrical box flange 105.

Figure 14:
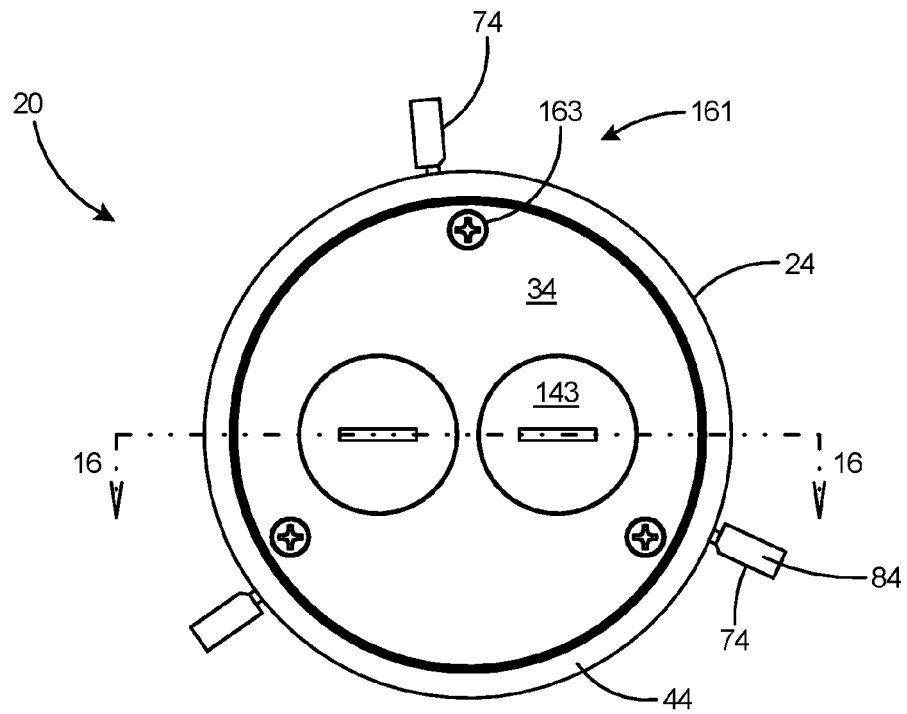
FIG. 14 is a top view of the floor box assembly.
Figure 15:
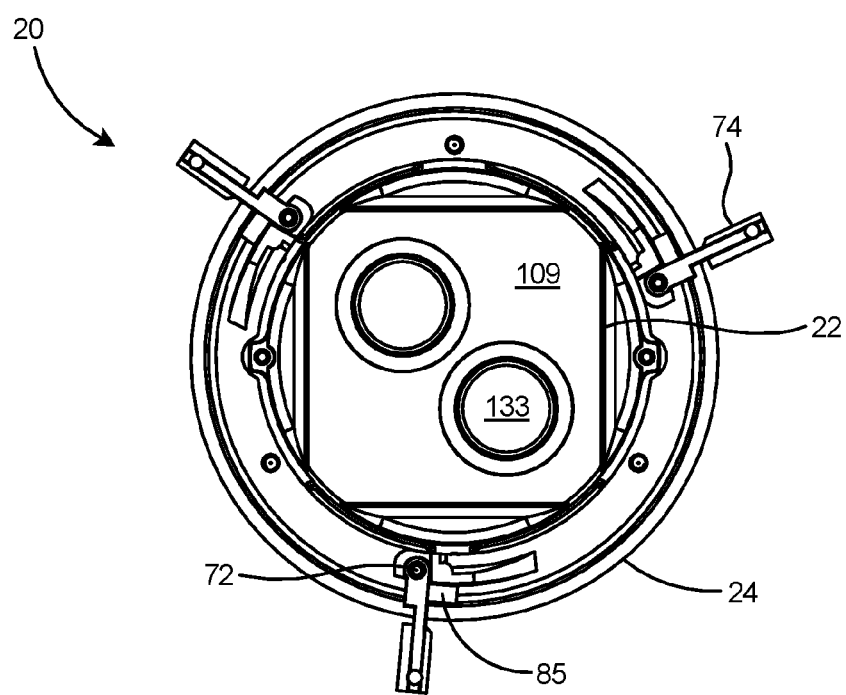
FIG. 15 is a bottom view of the floor box assembly.

With reference to FIGS. 14 and 15, floor box assembly 20 includes a cover plate mounting arrangement 161 including three fasteners 163 for securing the cover plate 34 to the electrical box 22 and bracket assembly 24. As shown in FIG. 15, end wall 109 may include one or more knockouts 133.

Figure 16:
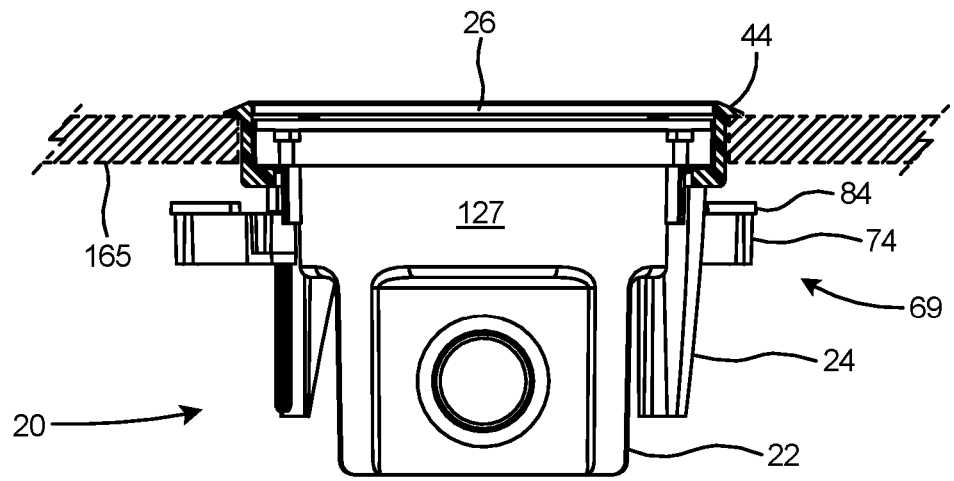
Figure 17:
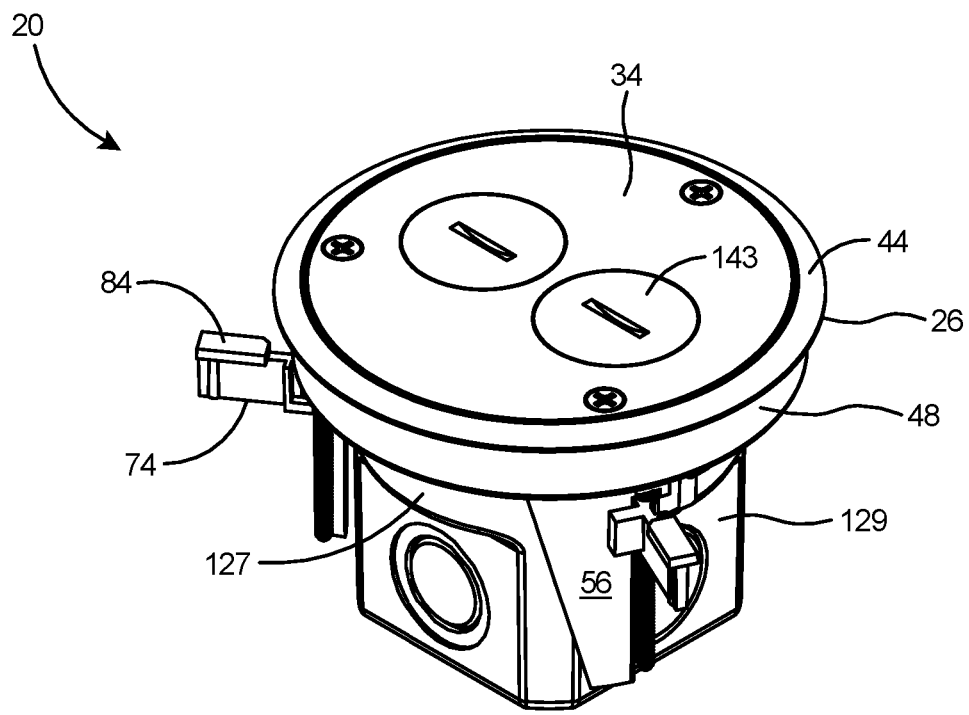
FIG. 17 is an isometric view of the floor box assembly.

Referring to FIGS. 16 and 17, rotatable wings 74 may be turned clockwise to draw the pads 84 of the floor mounting arrangement 69 tightly against the back surface 165 of a floor, wall, or similar structural support, to secure floor box assembly 20 to the structural support. Arcuate side wall 127 of electrical box 22 is of substantially circular shape, thereby enabling installation of the floor box assembly 20 to a floor with a circular hole therein.

As an example, to mount an floor box assembly 20 according to the present invention to a floor, the assembly including a 3½ inch round floor box and a 4½ inch cover, an installer would use a 4-inch diameter hole saw to cut a hole in the floor, taking care to avoid structural framing members. Referring to FIG. 1, the bracket assembly 24 is inserted through the floor and the rotatable wings 74 of clamping assembly 28 are tightened until the pads 84 are drawn tightly against the floor. Electrical cable is then pulled into the electrical box 22, an electrical component 36 is installed in the box, and wiring connections to the component 36 are completed. The electrical box 22 is then inserted into the bracket assembly 24 and fastened thereto by fasteners 166 threaded into bosses 65 of bracket assembly 24. Gasket support plate 30 is then secured to the duplex receptacle by fastener 167 driven through center aperture 92 of gasket support plate 30 into aperture 123 of duplex receptacle 36.

Gasket 32 is inserted over the gasket support plate 30, and a cover plate 34 is nested within the recessed area on top of the electrical box 22 and interior of the outer rim 44 of the bracket body 26. Three fasteners 163 are then installed and tightened to secure the cover plate 34 and gasket 32 to the floor box assembly 20. The floor box assembly 20 creates a substantially flush mount of the cover plate to the floor surface.

The floor box assembly of the present invention can also be installed on a concrete floor provided that electrical conduit is available from underneath the floor.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A floor box assembly for providing substantially flush mounting of an electrical box to a floor, comprising:
    a bracket assembly including a bracket body having an inner periphery and a shelf supporting an electrical box;
    said electrical box including a recessed area for mounting of a duplex receptacle;
    a gasket support plate, said gasket support plate including a planar plate body including two outlet openings and an aperture;
    said outlet openings in said gasket support plate are axially aligned;
    two tabs extending from said gasket support plate; and
    said tabs in alignment with the axis of said support plate openings, said tabs including sides; and
    a cover plate for nesting within said recessed area of said electrical box, said cover plate including outlet openings therein.

2. The floor box assembly of claim 1, further comprising a flange on said electrical box, said flange of said electrical box nesting within said inner periphery of said bracket body and on said shelf.

3. The floor box assembly of claim 2, further comprising a floor mounting arrangement on said bracket assembly.

4. The floor box assembly of claim 3, wherein said floor mounting arrangement comprises:
    a mounting screw extending through said shelf of said bracket body; and
    a rotatable wing secured to said mounting screw.

5. The floor box assembly of claim 4, further comprising:
    a head and a shank on said mounting screw; and
    a distal end, a proximal end, and a pad on said rotatable wing.

6. The floor box assembly of claim 5, further comprising:
    a boss on said shelf of said bracket body; and
    a bore in said boss.

7. The floor box assembly of claim 6, further comprising a notch in the flange of said electrical box, said notch adapted to align with said boss of said bracket body for securing said electrical box to said bracket body.

8. The floor box assembly of claim 2, further comprising:
    a gasket, said gasket adapted to nest between said cover plate and said electrical box and seal against said flange of said electrical box; and
    said gasket including an outer edge and openings configured for axial alignment with a corresponding outlet opening in said cover plate.

9. The floor box assembly of claim 1, further comprising:
    an outlet opening in said cover plate; and
    a removable outlet cover in said outlet opening of said cover plate.

10. The floor box assembly of claim 9, further comprising:
    a threaded outer edge on said removable outlet cover; and
    a threaded edge on said cover plate at said outlet opening enabling threaded engagement of said outlet cover to said outlet opening.

11. The floor box assembly of claim 1, further comprising:
    a bottom side on said gasket support plate; and
    a rail extending from the bottom side of the gasket support plate along each side of the tabs.

12. The floor box assembly of claim 11, further comprising:
    a side wall and end wall on said electrical box;
    an electrical enclosure defined by said side wall and end wall of said electrical box; and
    said gasket support plate nesting within said electrical enclosure of said electrical box.

13. The floor box assembly of claim 1, further comprising a side wall on said electrical box, said side wall adapted to pass through said inner periphery of said bracket body.

14. A floor box assembly for providing substantially flush mounting of an electrical box to a floor, comprising:
    a bracket assembly including a bracket body having an inner periphery and a shelf supporting an electrical box;
    said electrical box including a recessed area for mounting of a duplex receptacle;
    a cover plate for nesting within said recessed area of said electrical box, said cover plate including outlet openings therein;
    a gasket support plate having a bottom side;
    said gasket support plate including a planar plate body including two outlet openings and an aperture;
    two tabs extending from opposing ends of said gasket support plate; and
    a rail extending from the bottom side of the gasket support plate along each side of the tabs, said rails of said gasket support plate bracketing said ears of said duplex receptacle and extending into said recess of said electrical box.

15. A floor box assembly for providing substantially flush mounting of an electrical box to a floor, comprising:
    a bracket assembly including a bracket body, said bracket body including a ring having a shelf supporting an electrical box, a peripheral wall, and a collar including an inner periphery;
    said electrical box including a recessed area for mounting of a duplex receptacle including ears;
    a cover plate for nesting within said recessed area of said electrical box, said cover plate including a pair of outlet openings having removable outlet covers therein and slots in the outlet covers, said slots enabling engagement by a tool for selectively removing one or both of said outlet covers;
    a gasket support plate including a planar plate body having a bottom side and two outlet openings therein;
    a plurality of legs extending from the ring of the bracket body; and
    a plurality of bosses on said shelf.

16. The floor box assembly of claim 15, further comprising:
    two tabs extending from opposing ends of said gasket support plate; and
    a rail extending from the bottom side of the gasket support plate along each side of the tabs; and
    said rails of said gasket support plate bracketing said ears of said duplex receptacle and extending into said recess of said electrical box.

* * * * *